(12) United States Patent
Khan et al.

(10) Patent No.: US 8,171,157 B2
(45) Date of Patent: May 1, 2012

(54) DISTRIBUTING BANDWIDTH ACROSS COMMUNICATION MODALITIES

(75) Inventors: Humayun Mukhtar Khan, Issaquah, WA (US); Sang K. Choe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 12/643,406

(22) Filed: Dec. 21, 2009

(65) Prior Publication Data

US 2011/0153863 A1 Jun. 23, 2011

(51) Int. Cl.
*G06F 15/16* (2006.01)

(52) U.S. Cl. ........................................ 709/235

(58) Field of Classification Search .......... 709/226, 709/232–235; 370/229–235
See application file for complete search history.

(56) References Cited

U.S. PATENT DOCUMENTS

| | | | |
|---|---|---|---|
| 6,345,279 B1 | 2/2002 | Li et al. | |
| 6,404,738 B1 * | 6/2002 | Reininger et al. | 370/236 |
| 6,564,263 B1 | 5/2003 | Bergman et al. | |
| 6,597,660 B1 | 7/2003 | Rueda | |
| 6,970,602 B1 | 11/2005 | Smith et al. | |
| 7,035,211 B1 * | 4/2006 | Smith et al. | 370/230 |
| 7,039,715 B2 * | 5/2006 | England et al. | 709/232 |
| 7,069,014 B1 | 6/2006 | Thenthiruperai et al. | |
| 7,130,268 B2 | 10/2006 | Mascolo | |
| 2003/0063564 A1 * | 4/2003 | Ha et al. | 370/230 |
| 2003/0152096 A1 * | 8/2003 | Chapman | 370/412 |
| 2003/0185214 A1 * | 10/2003 | Yang et al. | 370/395.4 |
| 2004/0085964 A1 * | 5/2004 | Vaananen | 370/395.4 |
| 2004/0214555 A1 | 10/2004 | Kumar | |
| 2005/0100056 A1 | 5/2005 | Chuberre | |
| 2005/0228896 A1 | 10/2005 | Nishida | |
| 2006/0221820 A1 | 10/2006 | Zeitak | |
| 2007/0081462 A1 | 4/2007 | Gefflaut | |
| 2007/0180119 A1 * | 8/2007 | Khivesara et al. | 709/226 |
| 2008/0049614 A1 | 2/2008 | Briscoe | |
| 2008/0259813 A1 | 10/2008 | Matta | |
| 2009/0316578 A1 * | 12/2009 | Mang et al. | 370/230 |

OTHER PUBLICATIONS

Martin Prangl et al., "Fast Adaptation Decision Taking for Cross-Modal Multimedia Content Adaption," ICME, Jul. 2006, 4 pages.
Susan McRoy et al., "Multimodal Content Adaptations for Heterogeneous Devices," Sep. 6, 2005, 34 pages.
Anthony J. Solon et al., "Bandwidth Determined Transmoding Through Fuzzy logic in Mobile Intelligent Multimedia Presentation Systems," Artif Intell Rev, vol. 26, 2006, pp. 325-363.
Maya Yajnik et al., "Measurement and Modelling of the Temporal Dependence in Packet Loss", UMASS CMPSCI Technical Report 98-78, 1998, pp. 1-22.
Sue B. Moon et al., "Correlation of Packet Delay and Loss in the Internet", Unv. of Mass., CMPSCI, Technical Report 98-11, Jan. 1998, pp. 1-12.

(Continued)

*Primary Examiner* — Glenton B Burgess
*Assistant Examiner* — Shirley Zhang
(74) *Attorney, Agent, or Firm* — Merchant & Gould

(57) ABSTRACT

Embodiments are configured to provide communication environments to communicating participants using a number of modality control features, but are not so limited. In an embodiment, a system includes a communications manager to manage an amount of available communication bandwidth to a number of communication modalities that include an audio modality, a video modality, an application sharing modality, and/or a file transfer modality. In one embodiment, available bandwidth can be distributed by controlling an audio state, a video state, an application sharing state, and/or a file transfer state, including using first and second distribution ratios as part of allocating available bandwidth.

20 Claims, 6 Drawing Sheets

OTHER PUBLICATIONS

Manish Jain et al., "End-to-End Available Bandwidth: Measurement Methodology, Dynamics, and Relation with TCP Throughput", IEEE/ACM Transactions on Networking, vol. 11, No. 4, Aug. 2003, pp. 537-549.

Jörg Widmer et al., "End-to-end Congestion Control for Flows with Variable Packet Size", Technical Report, ID: IC/2002/82, 41 pages.

Jacob Strauss et al., "A Measurement Study of Available Bandwidth Estimation Tools," IMC, 2003, Oct. 27-29, 2003, 6 pages.

Li Lao et al., "The Probe Gap Model Can Underestimate the Available Bandwidth of Multihop Paths", ACM SIGCOMM Computer Communication Review, 2006, 6 pages.

Ningning Hu et al. "Locating Internet Bottlenecks: Algorithms, Measurements, and Implications", SIGCOMM '04, Aug. 30-Sep. 3, 2004, 14 pages.

Minghua Chen et al., "Multiple TFRC Connections Based Rate Control for Wireless Networks", IEEE Transactions on Multimedia, vol. 8, No. 5, Oct. 2006, pp. 1045-1062.

Cheng Jin et al., "FAST TCP: Motivation, Architecture, Algorithms, Performance", IEEE INFOCOM, 2004.

Tom Auld et al., "Bayesian Neural Networks for Internet Traffic Classification," IEEE Transactions on Neural Networks, vol. 18, No. 1, Jan. 2007, pp. 223-239.

Andrew W. Moore et al., "Internet Traffic Classification Using Bayesian Analysis Techniques," Sigmetrics'05 Jun. 6-10, 2005.

\* cited by examiner

DISTRIBUTING BANDWIDTH ACROSS COMMUNICATION MODALITIES

BACKGROUND

Computer networking technology has progressed to enable real-time interactive collaboration environments. Users can remotely participate in online presentations (desktop sharing for example), web conferences, and/or real time voice (voice-over-internet-protocol (VOIP) and video calls. Providing quality communications in networked environments can be vulnerable to various networking conditions (e.g., jitter, packet losses, congestion, etc.). Generally, an end-user's experience is dictated in part by the communication equipment (e.g., hardware, software, etc.) and functionality of some communication network being used. Certain networks can have a limited amount of bandwidth available to associated communication channels and include other communication limitations (e.g., joining real-time conference using a constrained communication channel). Signal processing techniques are used in attempts to compensate for certain unfavorable network and other communication conditions in attempting to provide quality user experiences.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are configured to provide communication environments to communicating participants using a number of modality control features, but are not so limited. In an embodiment, a system includes a communications manager to manage an amount of available communication bandwidth to a number of communication modalities that include an audio modality, a video modality, an application sharing modality, and/or a file transfer modality. In one embodiment, available bandwidth can be distributed by controlling an audio state, a video state, an application sharing state, and/or a file transfer state, including using first and second distribution ratios as part of allocating available bandwidth.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
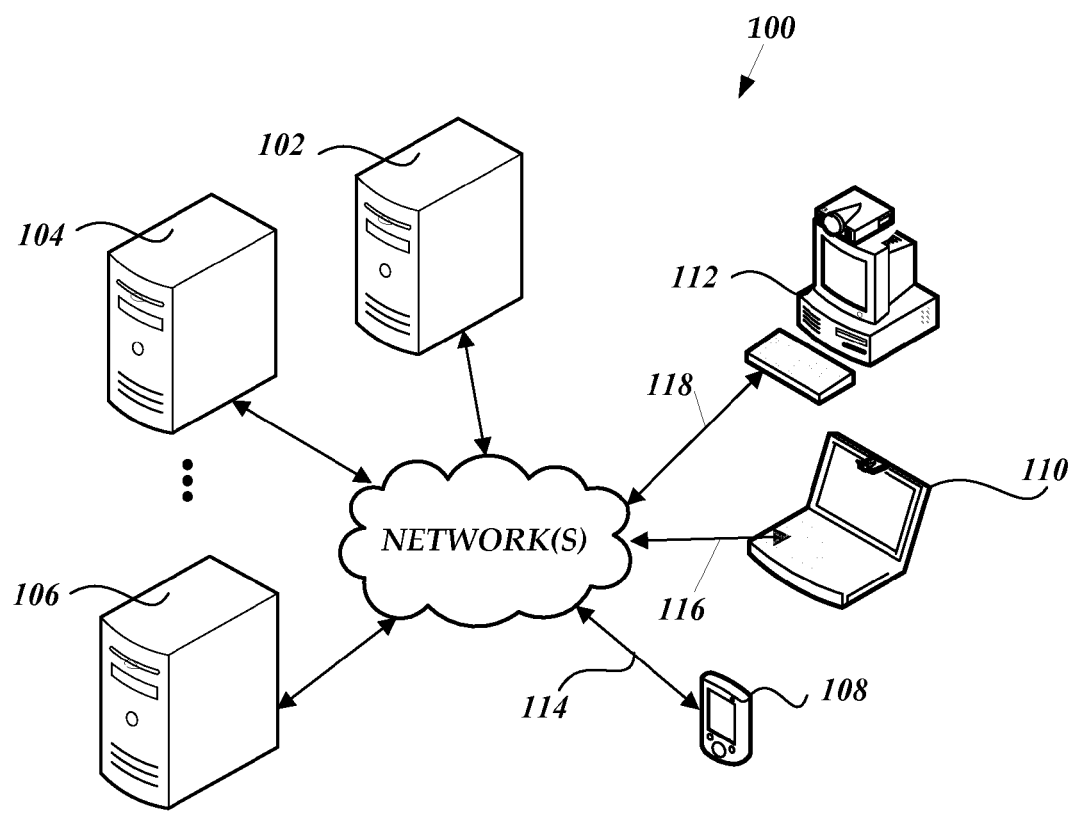
FIG. 1 is a block diagram of an exemplary communication environment.

FIG. 1 is a block diagram of an exemplary communication environment 100. In an embodiment, components of the communication environment 100 operate to provide an interactive communication experience to associated users under various network and communication conditions. As discussed below, the components can be used to allocate bandwidth to various modalities as part of providing a communication stream to each user. For example, one user may have a totally different video conferencing and application sharing experience than another user; each user experience can be limited in part by the network(s) and communication hardware and software being used to communicate.

In one embodiment, the communication environment 100 includes a communications manager or manager component that can be used in controlling modality allocations and/or features as part of a multi-modal communication environment that includes an audio modality, a video modality, an application or desktop sharing modality, and/or a file transfer modality, but the components are not so limited. Other modalities and/or modality combinations can be implemented in other embodiments.

The communications manager of an embodiment can operate to perform allocation operations to various communication modalities based in part on user-experience and other communication quality parameters. For example, the communications manager can operate to allocate bandwidth to different modality channels based in part on minimum useable thresholds, quality thresholds, and/or maximum thresholds for each modality. As one example, the communications manager can use a bandwidth estimate of a particular communication channel in part to allocate different amounts of bandwidth to each modality channel as part of facilitating a real-time collaboration session for collaborating users.

As shown in FIG. 1, the exemplary communication environment 100 includes a network of computing devices/systems and communication infrastructure. For example, the environment 100 may include multiple communication networks, a number of server components (e.g., web server 102, collaboration server 104, file server 106, etc.), and/or client devices/systems having multi-modal communication functionalities (e.g., smart phone 108, laptop 110, desktop 112, etc.). In one embodiment, a communication serving component can operate to allocate and/or distribute amounts of available bandwidth to corresponding communication channels as part of providing a real-time communication environment that includes audio, video, application sharing, and/or file transfer modalities and corresponding channels, paths, or links.

For example, a dedicated server can be associated with the allocation and/or distribution of any available bandwidth to communication components and/or modalities. Accordingly, one or more servers can be dedicated to operations associated with audio communications, video communications, application sharing communications, and/or file transfer communications. Exemplary communication environments can include secure networks, unsecure networks, hybrid networks, or some other network or combination of networks. By way of example, and not limitation, the environment 100 can include wired media such as a wired network or direct-wired connection, and/or wireless media such as acoustic, radio frequency (RF), infrared, and/or other wireless media.

As shown by the example of FIG. 1, the smart phone 108 is coupled to the network via communication channel or link 114, laptop 110 is coupled to the network via communication channel 116, and the desktop 112 is coupled to the network via communication channel 118. As described below, a bandwidth estimate can be determined for each communication channel and used to allocate and/or distribute bandwidth for each modality channel. For example, a user's available bandwidth while working remotely (e.g., home, second office, etc.) can vary due in part to various communication conditions including device/system and network limitations, constraints, and/or functional capability.

For example, components of a public and/or private packet network can be used for audio conferencing, video conferencing, audio/video conferencing, collaborative application sharing, and file transfers. In an exemplary implementation, a packet network can be coupled to a Public Switched Telephone Network (PSTN) via one or more suitable gateways (e.g., VOIP gateways) arranged to convert between circuit-switched information and packet information. Each participant may be using various types of wired or wireless communication links operating at varying connection speeds or bandwidths, such as a lower bandwidth telephone connection (e.g., PSTN), a medium bandwidth direct service line (DSL) modem connection, a higher bandwidth cable modem connection, and even higher communication bandwidths offered by local area network (LAN), wide area network (WAN), and other high bandwidth connections/components.

In an embodiment, a communications manager component can be used in part to facilitate communications over a communication channel to a plurality of communicating participants. The component can operate to manage an amount of available bandwidth by controlling: an audio parameter based in part on audio threshold values and an amount of available communication channel bandwidth, an application sharing parameter based in part on application sharing threshold values and the amount of available communication channel bandwidth remaining after controlling the audio parameter, a video parameter based in part on video threshold values and the amount of available communication channel bandwidth after controlling the application sharing parameter, and/or a file transfer parameter based in part on file transfer threshold values and the amount of available communication channel bandwidth after controlling the video parameter. In one embodiment, the component can operate further by using a first distribution ratio to distribute any additional amount of communication channel bandwidth after allocating audio and video channel bandwidth to maximum threshold values, and using a second distribution ratio after using the first distribution ratio to distribute any additional bandwidth that is available or becomes available.

It will be appreciated that a particular communication channel or path may be undergoing various communication states and other factors that affect modality quality (e.g., bandwidth (amount, availability, unavailability, etc.)) and other communication parameters that define each user's multi-modal experience. For example, a transmitting client device may include better communication features (e.g., encoding components, decoding components, processing capabilities, memory size and availability, active programs and operations consuming processing and memory capacity, etc.) and have access to a higher bandwidth communication channel (e.g., better network access) than a receiving client device. Thus, a receiving client device may need to allocate channel bandwidth to (and include or exclude) certain modalities according to a desired multi-modal experience.

Figure 2:
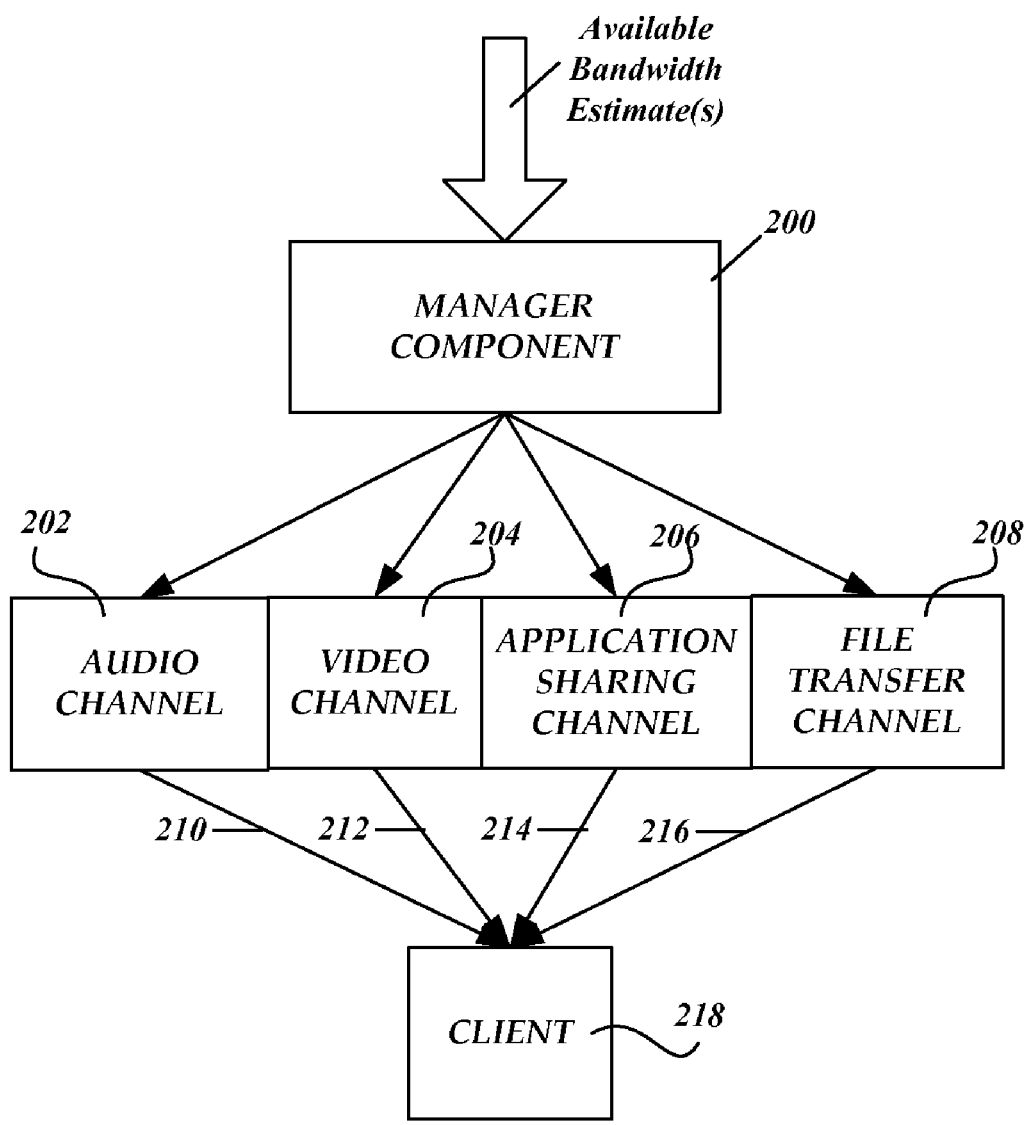
FIG. 2 is a block diagram of a number of modality channels of an exemplary communication environment.

FIG. 2 is a block diagram that depicts an exemplary communication environment that includes a communications manager 200 and a number of modality channels. The communications manager 200 can be used as part of allocating bandwidth to a number of the modality channels using a number of allocation operations, but is not so limited. For example, a conferencing server can use the functionality of the communications manager 200 to facilitate multimedia communications over packet-based, hybrid, and other networks to communicating participants who are communicating using audio, video, application sharing, and/or file transfer modalities.

In an embodiment, the communications manager 200 operates to allocate bandwidth to various communication modalities using a number of allocation phases and distribution features. As described below, since each user's channel state or available bandwidth may be different (e.g., different network constraints), the communications manager 200 can operate to allocate and/or distribute an amount of available bandwidth to each communicating client device/system using the phases as part of providing a multi-modal communication experience. In one embodiment, channel states of each participant can be updated with every channel state change (e.g., add, remove, start, and stop). Channel states can also be updated whenever a new bandwidth estimate is received. If a bandwidth estimate is not available, a channel state can be updated on some periodic or other basis.

In an embodiment, one or more components (e.g., server, client, network component, etc.) of a real-time communication environment can use a communications manager 200 to control aspects of the communication environment by controlling a parameter of an audio channel 202, a parameter of a video channel 204, a parameter of an application sharing channel 206, and/or a parameter of a file transfer channel 208. In one embodiment, a channel bandwidth estimate can be determined for each channel and used by the communications manager 200 when allocating and/or distributing an amount of available bandwidth, described further below.

In an embodiment, each channel is communicatively coupled (e.g., wired and/or wireless) to a dedicated server or serving component that includes a communications manager 200 (e.g., server(s) dedicated to audio and/or video communications, server dedicated to application sharing communications, server dedicated to file transfer communications, etc.), and distribution operations are based in part on an amount of bandwidth available to each communicating client and any corresponding operational modalities.

For example, the communications manager 200 can use a multi-modal channel bandwidth estimate as a basis for allocating an amount of available bandwidth to one or more of the channels 202-208. In one embodiment, feedback data (e.g., encoded signals) can be included and used as part of estimating channel bandwidth. For example, a feedback coupling or piggy back data can be used with the application sharing channel 206 to communicate allocated bandwidth estimates and window size parameters to an encoding or other communication component for use in managing available bandwidth.

In one embodiment, each client can provide an estimate of an amount of available channel bandwidth to the communications manager 200. In another embodiment, a server or other component can estimate an amount of communication bandwidth available to a particular client based in part on detected channel states, prior communication parameters, current communication parameters, and/or other parameters for example. It will be appreciated that the communication environment can include different numbers, combinations, and/or configurations of channels and other components and additional ways to estimate bandwidth of any particular communication channel. For example, audio and video can share a channel in certain architectures and/or a plurality of communications managers can be implemented in particular communication regions or areas to facilitate bandwidth allocations to communicating participants of each area or entity or other grouping.

In an embodiment, the communications manager 200 operates to manage an allocation of available bandwidth to each channel or portion based in part on a number of channel allocation phases. It will be appreciated that each phase can be modified based in part on the number and/or types of communication modalities being used. In one embodiment, the communications manager 200 uses a bandwidth allocation phase to manage functional minimums of each modality by prioritizing bandwidth allocation operations to the audio channel 202, followed by bandwidth allocation operations to the application sharing channel 206 (if bandwidth is available), followed by bandwidth allocation operations to the video channel 204 (if bandwidth is available), and followed by bandwidth allocation operations to the file transfer channel 208 (if bandwidth is available). In one embodiment, the communications manager 200 considers any policy setting(s) that may require particular channel(s) to stay below (or above alternatively) a certain bandwidth load. If there is a set policy, a maximum can be defined to be the lower of either the policy setting or the bandwidth needed to achieve some quality or use threshold.

As an example, a functional minimum can be defined as a modality threshold level (e.g., rate (bps)) that provides some operational functionality for each modality or channel but not quite enough quality to satisfy a level of service requirement or some other qualitative and/or quantitative measure. For audio communications, the communications manager 200 of one embodiment uses a type of codec (e.g., absent using redundancy or redundant operations) being used with the audio channel 202 as a basis for a threshold level of the audio functional minimum. If a codec type is unknown, the communications manager 200 can use a default value (e.g., 30 kbps). After satisfying functional minimums for each modality, the communications manager 200 uses another bandwidth allocation phase to maximize audio communications by allocating additional available bandwidth to the audio channel 202 to (or attempt to) attain a maximum audio threshold level. Once the maximum threshold or level is attained, the communications manager 200 uses another bandwidth allocation phase to allocate additional available bandwidth to attain a base quality threshold level for the video channel 204.

If additional bandwidth is (or becomes) available after attaining the base quality threshold level for video communications, the communications manager 200 allocates additional bandwidth to the application sharing channel 206, video channel 204, and the file transfer channel 208 using distribution ratios to allocate a higher ratio of the available bandwidth to the application sharing channel 206 (e.g., 50% to application sharing channel 206, 30% to the video channel 204, and 20% to the file transfer channel 208) as part of attaining a base quality threshold for the application sharing modality. It will be appreciated that different ratios can be used according to different implementations of prioritizing allocations to the application sharing channel 206 in this phase.

If additional bandwidth is (or becomes) available after attaining the base quality threshold level for application sharing communications, the communications manager 200 allocates the additional bandwidth according to a defined ratio or allocation (e.g., a first fraction (e.g., 40%) to application sharing channel 206, a second fraction (e.g., 40%) to the video channel 204, and a third fraction (e.g., 20%) to the file transfer channel 208) as part of attaining maximum thresholds for the application sharing, video, and file transfer modalities. Different ratios and/or distributions can be used according to different implementations of prioritizing allocations to attain maximum or other quality thresholds.

In certain embodiments, the communications manager 200 can base modality allocation operations in part on a bandwidth estimate and/or a current amount allocated to (or being used by) each modality or channel. In one embodiment, the communications manager 200 can operate to update or use channel bandwidth states according to some timing criteria (e.g., periodic basis (1 sec., 5 sec., 10 sec, etc.)) if a bandwidth estimate is unavailable. The communications manager 200 of one embodiment can operate to allocate available bandwidth to each channel using current allocation levels and/or quality thresholds that are defined relative to minimum and/or maximum quality thresholds in terms of bits per second (bps).

Table 1 lists a number of exemplary minimums where quality is typically unacceptable, functional minimums where quality is typically acceptable but does not provide a satisfactory or required user experience, base quality thresholds where quality is typically at or above a satisfactory standard, and maximum thresholds for various communication modalities. It will be appreciated that other thresholds and/or values can be used according to aspects of particular communication environment.

TABLE 1

| Modality | Min | Functional Min | Base Quality | Max |
|---|---|---|---|---|
| Audio | 0 | Defined by codec | Defined by codec | 30 kbps-200 kbps |
| Video | 15 kbps | 70 kbps (variable) | 150 kbps (variable) | 2 Mbps |
| Application Sharing | 0 | 70 kbps | 512 kbps | 50 Mbps |
| File Transfer | 0 | 20 kbps | 512 kbps | 50 Mbps |

Table 2 lists a number of exemplary minimum bandwidth thresholds, maximum bandwidth thresholds, and good user experience thresholds for various communication modalities. As shown in Table 2, a pano video modality can be included as part of providing a communication session. It will be appreciated that other values can be used according to aspects of particular communication environment and embodiments can include multiple audio/video/application sharing/file transfer/etc. sessions.

TABLE 2

| Modality | Min acceptable BW | Max BW | Good user experience |
|---|---|---|---|
| 1-Audio | 0 kbps | 200 kbps | 80 kbps |
| 2-Video | 70 kbps | 1.6-2 Mbps | 150 kbps |
| 3-Pano Video | 70 kbps | 350 Kbps | 150 kbps |
| 4-App sharing | 70 kbps | 50 Mbps | 512 kbps |
| 5-File Transfer | 20 kbps | 2 Mbps | 512 kbps |

As shown in FIG. 2, the allocated amounts of bandwidth are used to communicate modality signals 210-216 (e.g., packets) to a communicating participant (e.g., client 218) as part of ensuring minimal amounts (if any) of audio jitter, audio loss, etc. It will be appreciated that any number of communicating participants can be communicating with other communicating participants and/or the communications manager 200 of various embodiments. Using the various bandwidth allocation operations of each bandwidth allocation phase, the communications manager 200 is able to provide optimal audio communications as quickly as possible according to an amount of bandwidth available to a given user when facilitating communications between communication participants.

Figure 3:
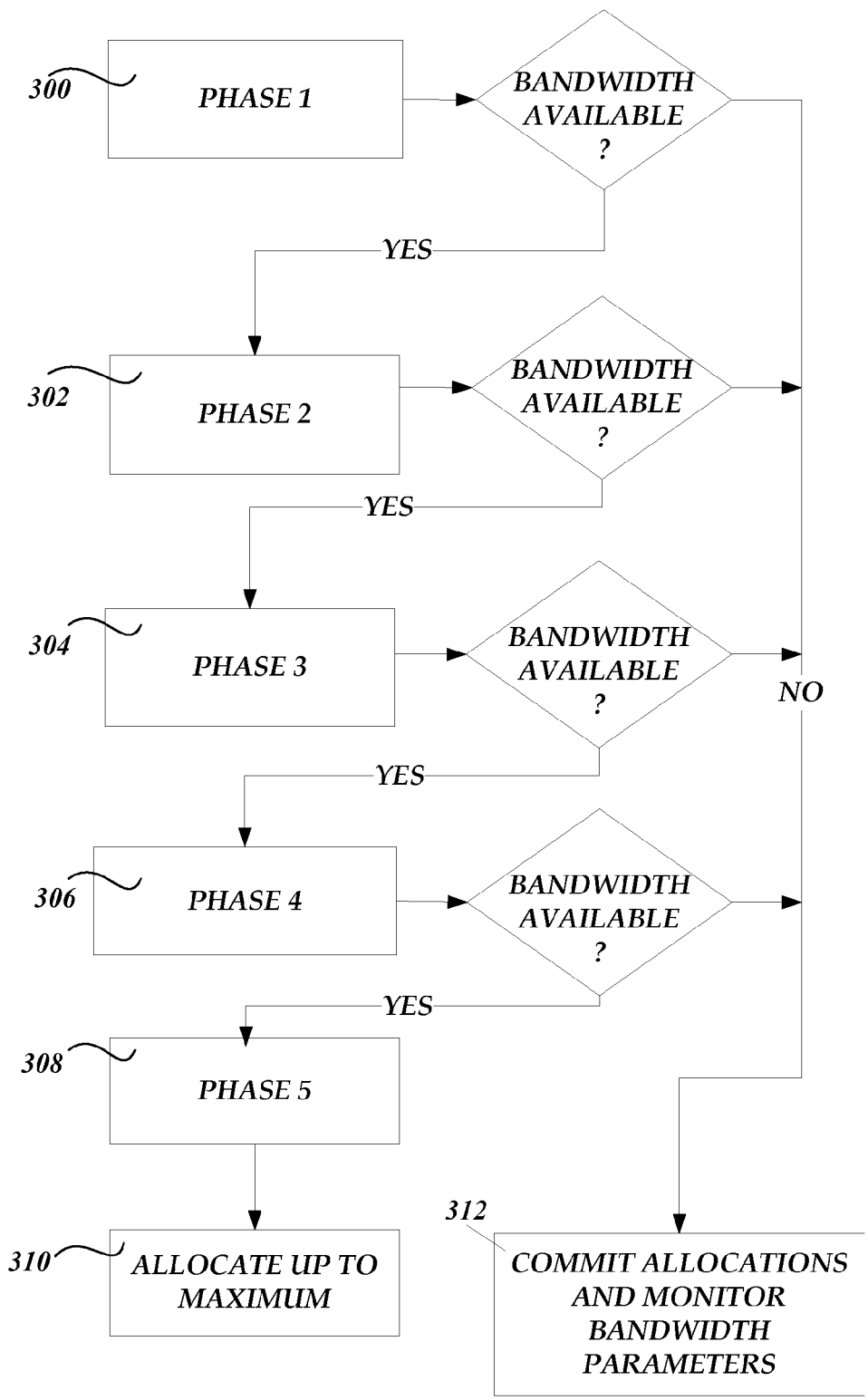
FIG. 3 is a flow diagram depicting an exemplary process of managing aspects of a communication environment.

FIG. 3 is a flow diagram depicting an exemplary process of managing aspects of a communication environment. For example, the process can be used to manage an amount of bandwidth available to a number of communicating users. In one embodiment, a channel bandwidth estimate can be used as part of allocating an amount of available bandwidth to each modality. For example, each client device of a communication system can operate to provide a bandwidth estimate using a channel estimation technique for a current communication channel or channels.

As shown in FIG. 3, the allocation phases of an embodiment include a first allocation phase 300 to allocate an amount of available bandwidth to an audio modality as a priority, next to an application sharing modality, followed by a video modality, and then to a file transfer modality as part of allocating amounts of available bandwidth to achieve functional thresholds for each modality. If there is not enough bandwidth available to attain one or more functional minimums for the modalities, allocated amounts are committed and used as part of providing respective modality functionalities during a communication session.

At 302, if additional bandwidth is (or becomes) available after the first allocation phase, a second allocation phase is used to allocate an amount of the additional bandwidth up to a maximum audio threshold for the audio modality. At 304, if additional bandwidth is (or becomes) available after completing the second allocation phase, a third allocation phase is used to allocate an amount of the additional bandwidth to the video modality up to a satisfactory video quality threshold (e.g., 150 kbps).

At 306, if additional bandwidth is (or becomes) available after completing the third allocation phase, a fourth allocation phase is used to allocate an amount of the additional bandwidth using a first distribution ratio. In one embodiment, the first distribution ratio is used to determine amounts of additional bandwidth to allocate to the application sharing, video, and file transfer modalities as part of achieving a satisfactory quality threshold for each modality, with the application sharing modality receiving a largest portion of the additional bandwidth.

For example, the first distribution ratio can be defined according to a video/application sharing/file transfer distribution (e.g., 0.3/0.5/0.2). Thus, as an example, for an available amount of bandwidth (e.g., 100 kbps) the first distribution ratio is used to distribute 30 kbps to video, 50 kbps to application sharing, and 20 kbps to file transfer until the application sharing modality reaches a defined threshold (e.g., 512 kbps). Again, it is possible that one or more of the modalities can have a maximum cap that is below a value they may reach using the first distribution ratio. If so, the respective modalities can be capped to the cap value and the distribution can be changed.

In one embodiment, the first distribution ratio is modified according to the following: if the file transfer modality is capped, the ratio for the remaining video and application sharing channels is set to first and second values (e.g., 0.4/0.6) respectively; if the video modality is capped, the ratio for the remaining application sharing and file transfer is set to first and second values (e.g., 0.8/0.2) respectively; and, if the application sharing modality is capped, the ratio for the remaining video and file transfer is set to first and second values (e.g., 0.8/0.2) respectively. For this phase, and in accordance with an embodiment, the allocations can be performed until the application sharing modality reaches a defined threshold or maximum, whichever is lower.

At 308, if additional bandwidth is (or becomes) available after the fourth allocation phase, a fifth allocation phase is used to allocate an amount of the additional bandwidth using a second distribution ratio. In one embodiment, the second distribution ratio is used to determine amounts of the additional bandwidth to allocate to the application sharing, video, and file transfer modalities, as part of attaining maximum thresholds for each modality at 310.

For example, the second distribution ratio can be defined as video/application-sharing/file transfer distribution (e.g., 0.4/0.4/0.2). Thus, as an example, for an available amount of bandwidth (e.g., 100 kbps) the second distribution ratio is used to distribute 40 kbps to video, 40 kbps to application sharing, and 20 kbps to file transfer. Again, it is possible that one or more of the modalities can have a maximum cap below a value they may reach using the second distribution ratio. If so, the respective modalities can be capped to the cap value and the distribution can be changed.

In one embodiment, the second distribution ratio is modified according to the following: if the file transfer modality is capped, the ratio for the remaining video and application sharing channels is set to first and second values (e.g., 0.5/0.5) respectively; if the video modality is capped, the ratio for the remaining application sharing and file transfer is set to first and second values (e.g., 0.8/0.2) respectively; and, if the application sharing modality is capped, the ratio for the remaining video and file transfer is set to first and second values (e.g., 0.8/0.2) respectively. For this phase, and in accordance with an embodiment, allocations can be performed until the remaining modalities reach the lesser of defined thresholds or maximums.

Each allocation amount can be stored in memory for each modality (e.g., local and/or remote memory locations). If available bandwidth is exhausted during allocation operations, at 312 allocation operations can be stopped or paused and the amount of bandwidth allocated to the modalities can be committed for the particular client or application. While a certain number and order of operations is described for the exemplary flow of FIG. 3, it will be appreciated that other numbers and orders can be defined according to a desired implementation.

Figure 4:
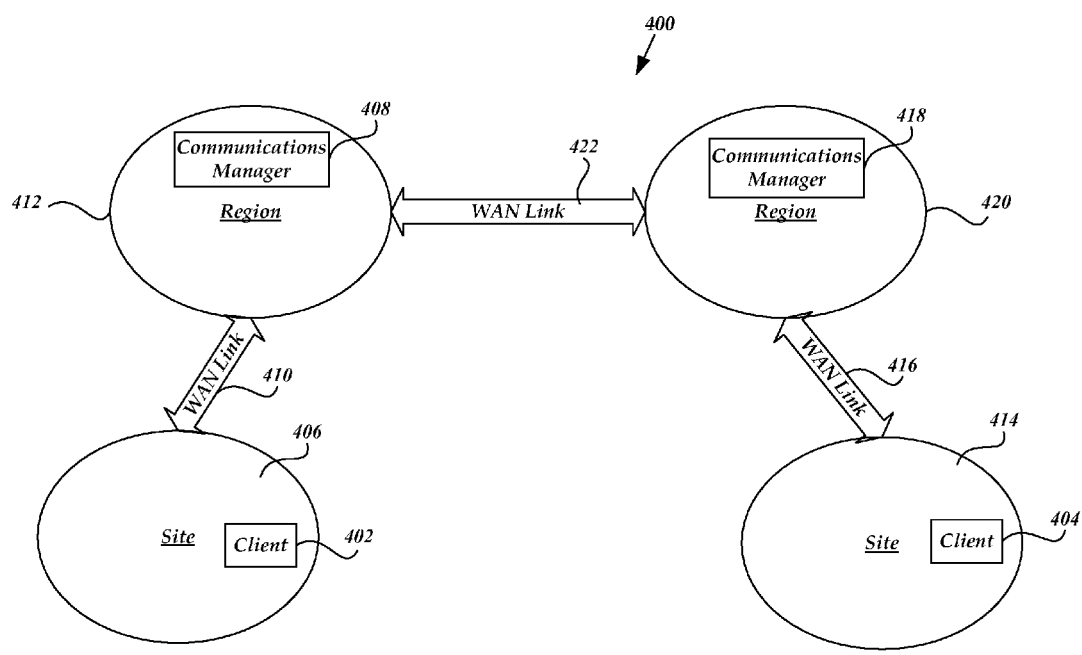
FIG. 4 depicts an exemplary communication environment.

FIG. 4 depicts an exemplary communication environment 400. As shown by example, a first user client 402 operating in conjunction with a multi-modal communication device (e.g., laptop, desktop, smart phone, etc.) is in communication with a second user client 404 operating in conjunction with an associated communication device. As shown in the exemplary environment 400, client 402 is associated with site 406 which is communicatively coupled (e.g., WAN link 410) to a communications manager 408 that facilitates communications to users associated with region 412.

Client 404 is associated with site 414 which is communicatively coupled (e.g., WAN link 416) to a communications manager 418 that facilitates communications to users associated with region 420. For example, communications manager 408 can be used to host computer-based video conferencing that includes application sharing and file transfer features for users at site 406, and communications manager 418 can be used to host computer-based video conferencing that includes application sharing and file transfer features for users at site 414. In another embodiment, one or more communications managers can be shared across various devices, sites, regions, etc.

As one example, communications between clients can be facilitated using one or more dedicated multimedia conference servers associated with some network(s). For example, a multimedia conference server can be configured to host multiple conferences and/or participants at the same time. Communicating participants may interact with audio, video, application sharing, file transfer and/or other applications, wherein the one or more servers manage multiple audio, video, and application sharing modalities that are associated with multiple participants.

A communications manager of one embodiment can be configured to facilitate communications across multiple locations (e.g., regions, areas, etc.) to communicating users. For example, one or more communications managers can be used to facilitate communications between a remote user on a smart phone having an installed client 402 who is taking part in a live conference with a laptop user having installed client 404. As shown in the exemplary environment 400, the communications managers are communicatively coupled to one another (e.g., WAN link 422). Typically, a bottleneck or communication congestion occurs at WAN links 410 and 416 before WAN link 422 due in part to the underlying network architecture. As described below, a communications manager of an embodiment can operate to allocate and/or distribute an amount of available bandwidth to one or more communication modalities for each communicating client based in part on bandwidth allocation and/or distribution features within the environment 400.

In an embodiment, a channel bandwidth estimate can be determined by a component of the environment 400 for each communicative coupling or path and used in part to distribute available bandwidth to communicating users. For example, bandwidth approximation techniques can be used to estimate an amount of bandwidth available to each communicating client (e.g., estimated bandwidths for each WAN link). In one embodiment, each client can operate to provide a bandwidth estimate for each operating channel to a communications manager as part of allocating bandwidth to various modalities for a particular client.

In one embodiment, each communications manager can operate to manage communication modalities by distributing an amount of communication bandwidth to an audio modality, a video modality, an application sharing modality, and/or a file transfer modality. For example, each communications manager can include computer readable instructions that operate to distribute available bandwidth to various communication modalities based in part on a number of distribution features to control states of each communication modality.

Components of the environment 400 include processor-based functionality that typically includes at least one processor and memory, multimedia input/output (I/O), and other components (e.g., microphones, speakers, video camera, display, keyboard, thumb board, keypad, touch screen, stylus, VOIP components, Internet components, network components, wireless and/or wired network components, etc.). For example, clients can comprise or implement any appropriate application programs and user interface controls to enable multimedia conferencing. Exemplary conferencing components include MICROSOFT OFFICE COMMUNICATOR components, MICROSOFT OFFICE LIVE MEETING components, and other multi-modal communication components.

Figure 5:
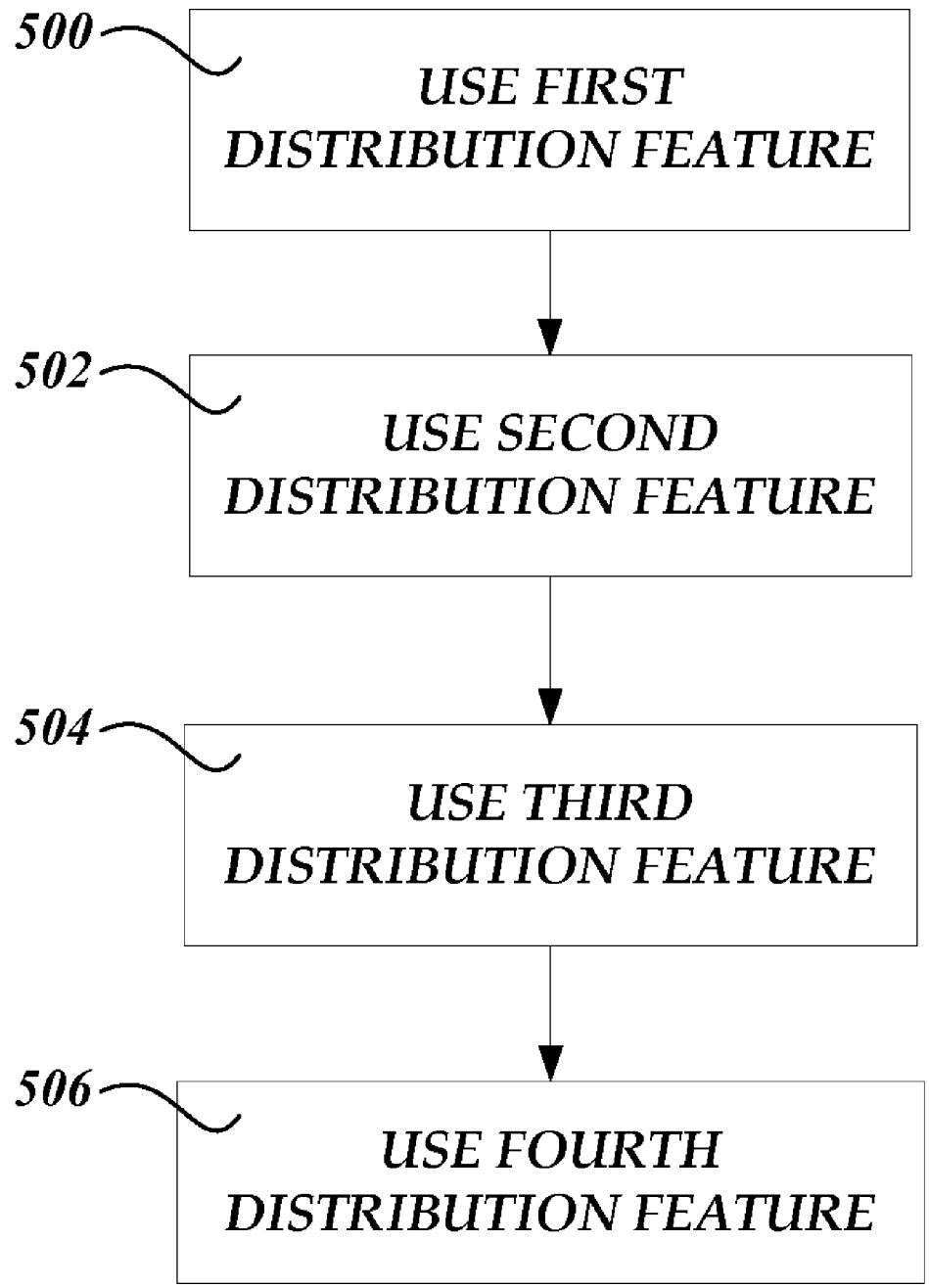
FIG. 5 is a flow diagram depicting an exemplary process of providing interactive communications.

FIG. 5 is a flow diagram depicting an exemplary process of providing interactive communications. In an embodiment, the process can be used to control a number of communication modalities as part of providing real-time or near real-time communications to communication participants. In one embodiment, a communications manager uses a number of distribution operations that include the use of a first distribution feature 500 to distribute an amount of available bandwidth first to an audio modality, second to an application sharing modality, third to a video modality, and fourth to a file transfer modality as part of distributing amounts of available bandwidth to achieve useable thresholds for each modality.

That is, the communications manager can use the first distribution feature 500 to prioritize distribution operations to achieve operational minimums for the audio, application sharing, video, and file transfer modalities. For example, the first distribution feature 500 can be used as part of managing a communication link to stream audio with little to no glitches (e.g., an audio loss and/or distortion noticeable to an end user) and without any redundancy frames, useable video (e.g., 70 kbps to deliver about 5-10 fps), and/or functional application sharing (e.g., 70 kbps sufficient amount to enable sharing operations for a remote desktop experience).

The communications manager uses a second distribution feature 502 to distribute any available bandwidth remaining after using the first distribution feature 500 up to a maximum amount for the audio modality. That is, the communications manager uses the second distribution feature 502 to again prioritize distribution operations to the audio modality before distributing bandwidth to other modalities to thereby ensure that audio immediately attains a maximum allocation above a defined or achievable useable minimum. For example, a maximum audio level can be based on any useable codecs that include redundancy features that account for packet loss.

The communications manager uses a third distribution feature 504 to distribute any available bandwidth remaining after using the second distribution feature 502 up to a quality threshold for the video modality. For example, an acceptable quality video threshold (e.g., 150 kbps) can deliver about 15 frames per second (fps) with about 1 to 3% frame loss for a video conferencing environment where there is typically little change in video from frame to frame (e.g., as compared with video that includes large changes from frame to frame).

The communications manager further uses a fourth distribution feature 506 to distribute any available bandwidth remaining after using the third distribution feature 504 by applying a first distribution ratio to distribute any available remaining bandwidth. In one embodiment, the first distribution ratio is used to distribute a first percentage of the available bandwidth remaining to the video modality, a second percentage of the available bandwidth remaining to the application sharing modality, and a third percentage of the available bandwidth remaining to the file transfer modality, wherein the first percentage is the largest percentage. The communications manager of another embodiment, can use a fifth distribution feature to distribute any available bandwidth remaining after using the fourth distribution feature 504 by applying a second distribution ratio to distribute any available remaining bandwidth as part of managing the communications. While a certain number and order of operations is described for the exemplary flow of FIG. 5, it will be appreciated that other numbers and orders can be defined according to a desired implementation.

Various embodiments can be implemented as a computer process (method), a computing system/device, an article of manufacture, such as a computer program product or computer readable media, and as part of various multi-modal communication architectures. An exemplary computer program product can include computer storage media that includes instructions useable by a computing entity. Certain embodiments for controlling multimedia can vary depending upon a set of communication protocols or standards used (e.g., Session Initiation Protocol (SIP)) and other signaling standards and/or variants.

For example, a multimedia communication environment can be implemented in accordance with International Telecommunication Union (ITU) H.323 standards that include a multipoint control unit (MCU) to coordinate conferencing operations, such as the H.245 signaling and other operations, and one or more multipoint processors (MP) to mix and process signal streams. Other signaling protocols can be used (e.g., SIP Instant Messaging and Presence Language Extensions (SIMPLE), Real-time Transport Protocol (RTP), etc.).

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components (e.g., servers). While certain embodiments include software implementations, they are not so limited and encompass hardware, or mixed hardware/software solutions. Other embodiments and configurations are available.

Exemplary Operating Environment

Figure 6:
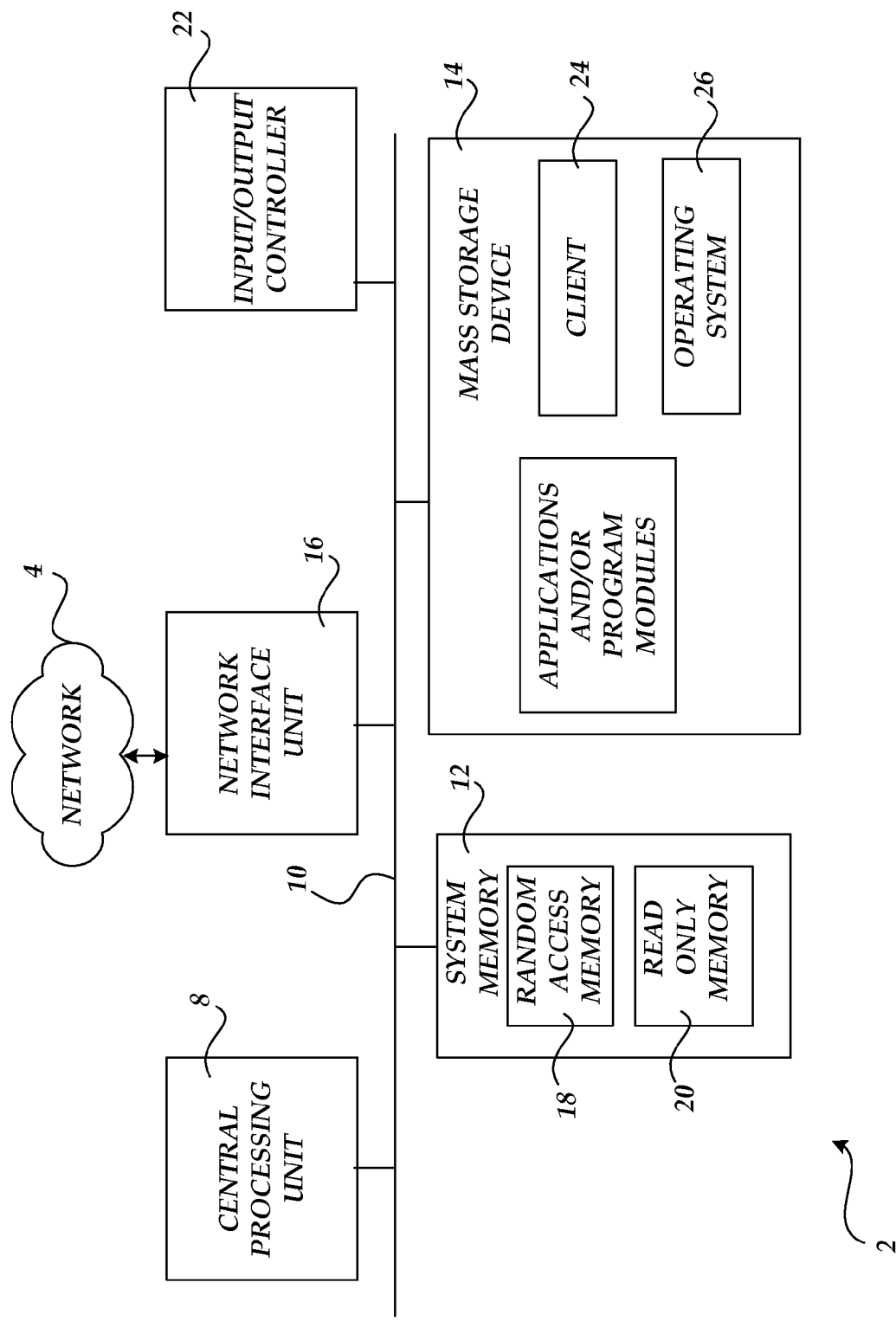
FIG. 6 is a block diagram illustrating an exemplary computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an illustrative operating environment for embodiments of the invention will be described. As shown in FIG. 6, computer 2 comprises a general purpose desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 32, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 32 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as a client 24, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of communicating comprising:
controlling an audio parameter based in part on audio thresholds and an amount of available communication bandwidth to attain a maximum allocation for an audio modality as part of a first allocation phase to allocate the amount of communication available bandwidth to the audio modality as a priority, next to an application sharing modality, followed by a video modality, and then to a file transfer modality during the first allocation phase and a second allocation phase to allocate an amount of additional bandwidth up to a maximum audio threshold for the audio modality during the second allocation phase;
controlling an application sharing parameter based in part on application sharing thresholds and the amount of available communication bandwidth remaining for the application sharing modality after controlling the audio parameter during the first allocation phase;
controlling a video parameter based in part on a video threshold and the amount of available communication bandwidth for the video modality after controlling the application sharing parameter during the first allocation phase and using a third allocation phase to allocate an amount of additional communication bandwidth to the video modality up to a satisfactory video quality threshold; and
controlling a file transfer parameter based in part on a file transfer threshold and the amount of available communication bandwidth for a file transfer modality after controlling the video parameter during the first allocation phase, the controlling further including using a first distribution ratio that comprises a video, application sharing, and file transfer distribution as part of a fourth allocation phase to distribute any additional amount of communication bandwidth after achieving a video quality threshold and a second distribution ratio as part of a fifth allocation phase after using the first distribution ratio to distribute any remaining bandwidth.

2. The method of claim 1, further comprising modifying the first distribution ratio by:
changing a ratio for remaining video and application sharing channels to a video and an application sharing ratio if the file transfer modality is capped;
changing a ratio for remaining application sharing and file transfer to an application sharing and file transfer ratio if the video modality is capped; and
changing a ratio for remaining video and file transfer to a video and file transfer ratio if the application sharing modality is capped.

3. The method of claim 2, further comprising modifying the second distribution ratio by:
changing a ratio for remaining video and application sharing channels to a video and application sharing ratio if the file transfer modality is capped;
changing a ratio for remaining application sharing and file transfer to an application sharing and file transfer ratio if the video modality is capped; and
changing a ratio for remaining video and file transfer channels to a video and file transfer ratio if the application sharing modality is capped.

4. The method of claim 1, further comprising updating channel states for channel state changes including add, remove, start, and stop changes.

5. The method of claim 4, further comprising using an estimate of the amount of available bandwidth and updating parameters using new bandwidth estimates.

6. The method of claim 5, further comprising updating at least one of the channel states on a periodic basis if a bandwidth estimate is not available.

7. The method of claim 1, further comprising communicating a bandwidth estimate and a current modality value of any hosted channels for each communicating client.

8. The method of claim 7, further comprising determining a fraction of the bandwidth estimate to be distributed to a communicating client.

9. The method of claim 7, further comprising allocating the available bandwidth to each of the hosted channels including stopping the allocating and committing current allocated amounts upon reaching a limit or exhausting the available bandwidth.

10. The method of claim 1, further comprising defining a useable audio threshold based in part on a bandwidth required for a corresponding codec without redundancy.

11. The method of claim 10, further comprising defining the maximum audio threshold based in part on the amount of bandwidth required for a corresponding codec with redundancy enabled.

12. The method of claim 1, further comprising modifying one of the first distribution ratio and the second distribution ratio based in part on a capped modality state.

13. A system comprising:
at least one processor-based device;
a communication channel including an audio portion, a video portion, an application sharing portion, and a file transfer portion;
a manager component coupled to the communication channel to manage available bandwidth based in part on a number of allocation phases including:
a first allocation phase to allocate an amount of the available bandwidth first to the audio portion, second to the application sharing portion, third to the video portion, and fourth to the file transfer portion as part of allocating the amount of available bandwidth to achieve functional operation for each portion;
a second allocation phase to allocate any available bandwidth remaining after the first allocation phase up to a maximum level for the audio portion;
a third allocation phase to allocate any available bandwidth remaining after the second allocation phase to the video portion up to a video quality threshold level;
a fourth allocation phase to allocate any available bandwidth remaining after the third allocation phase using a first distribution ratio that comprises a first video, application sharing, and file transfer distribution; and
a fifth allocation phase to allocate any available bandwidth remaining after the fourth allocation phase using a second distribution ratio that comprises a second video, application sharing, and file transfer distribution; and
a memory component to store the information of each portion.

14. The system of claim 13, further comprising a client to provide a bandwidth estimate of an associated communication channel as part of allocating bandwidth to each portion.

15. The system of claim 13, further comprising a server to use a bandwidth estimate of a particular client communication channel to allocate bandwidth.

16. The system of claim 13, the manager component further operating to define a modality state based in part on a current amount of bandwidth allocated to a corresponding portion.

17. A computer storage medium coupled to a computing device that includes instructions to manage communication modalities by:
   distributing available bandwidth to the modalities that include an audio modality, a video modality, an application sharing modality, and a file transfer modality based in part on a number of distribution operations to control a state of each modality, the number of distribution operations based in part on:
   a first distribution feature of a first allocation phase to distribute an amount of the available bandwidth first to the audio modality, second to the application sharing modality, third to the video modality, and fourth to the file transfer modality as part of distributing the amount of available bandwidth to achieve useable thresholds for each modality;
   a second distribution feature of a second allocation phase to distribute any available bandwidth remaining after using the first distribution feature up to a maximum amount for the audio modality;
   a third distribution feature of a third allocation phase to distribute any available bandwidth remaining after using the second distribution feature up to a quality threshold for the video modality;
   a fourth distribution feature of a fourth allocation phase to distribute any available bandwidth remaining after using the third distribution feature by applying a first distribution ratio defined by a first video, application sharing, and file transfer distribution to distribute a first percentage of the available bandwidth remaining to the video modality, a second percentage of the available bandwidth remaining to the application sharing modality, and a third percentage of the available bandwidth remaining to the file transfer modality; and
   a fifth distribution feature of a fifth allocation phase to distribute any available bandwidth remaining after using the fourth distribution feature by applying a second distribution ratio defined by a second video, application sharing, and file transfer distribution.

18. The medium of claim 17 including instructions to manage the communication modalities further based in part on the fifth distribution feature to distribute any available bandwidth remaining after using the fourth distribution feature by applying the second distribution ratio to allocate a fourth percentage of the available bandwidth remaining to the video modality, a fifth percentage of the available bandwidth remaining to the application sharing modality, and a sixth percentage of the available bandwidth remaining to the file transfer modality up to the maximum threshold value of each modality or until the available bandwidth is exhausted.

19. The medium of claim 17 wherein the first percentage and the third percentage are each less than the second percentage of the first distribution ratio.

20. The medium of claim 18 wherein the sixth percentage is less that than the fourth percentage and the fifth percentage of the second distribution ratio.

* * * * *